(12) United States Patent
Guy

(10) Patent No.: US 8,434,973 B2
(45) Date of Patent: May 7, 2013

(54) CUTTING TOOL HAVING A CLAMPING MECHANISM

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 503 days.

(21) Appl. No.: 12/688,486

(22) Filed: Jan. 15, 2010

(65) Prior Publication Data

US 2010/0189520 A1 Jul. 29, 2010

(30) Foreign Application Priority Data

Jan. 28, 2009 (IL) .......................................... 196764

(51) Int. Cl.
  *B23D 5/02* (2006.01)
  *B23B 29/12* (2006.01)

(52) U.S. Cl.
  USPC ................................ 407/36; 407/101; 407/33

(58) Field of Classification Search .................. 407/101, 407/102, 33, 36, 37, 38, 39, 46, 73, 79, 80; 279/71, 102, 103, 9.1; 409/232; 403/53, 403/26, 109.1, 109.5, 273
  See application file for complete search history.

(56) References Cited

U.S. PATENT DOCUMENTS

| 22,681 | A | * | 1/1859 | Bugg | 126/364.1 |
| 1,824,509 | A | * | 9/1931 | Snader | 279/89 |
| 2,473,351 | A | * | 6/1949 | Thompson et al. | 248/188.5 |
| 2,910,315 | A | * | 10/1959 | Stevens | 403/367 |
| 3,953,138 | A |  | 4/1976 | Hine et al. |  |
| 4,597,699 | A | * | 7/1986 | Ramunas | 409/232 |
| 4,832,556 | A | * | 5/1989 | Dowling | 411/406 |
| 4,915,523 | A | * | 4/1990 | Andersson | 403/11 |
| 6,394,465 | B1 | * | 5/2002 | Guy | 279/9.1 |
| 2001/0041106 | A1 | * | 11/2001 | Nagaya et al. | 407/101 |

FOREIGN PATENT DOCUMENTS

| DE | 30 16 944 | 11/1981 |
| DE | 32 05 088 | 8/1983 |

OTHER PUBLICATIONS

International Search Report in PCT/IL2010/000029, dated May 25, 2010.

* cited by examiner

*Primary Examiner* — Sean Michalski
*Assistant Examiner* — Fernando Ayala
(74) *Attorney, Agent, or Firm* — Womble Carlyle

(57) ABSTRACT

A clamping mechanism includes a male portion and a female portion. The male portion has a forwardly extending locking protrusion, and an alignment protrusion extending forwardly of the locking protrusion. A rear of the female portion has a forwardly extending locking bore and an alignment bore extending forwardly from a front end of the locking bore. The locking bore has an insertion bore portion which merges with a gripping bore portion. The insertion bore portion has an insertion bore axis while the gripping bore portion has a gripping bore axis that is spaced apart by a non-zero first distance from the insertion bore axis. In a clamped position, the alignment protrusion abuts a portion of the alignment bore and the locking protrusion abuts the gripping bore portion along a gripping angular extension, thereby forming a circumferential interference fit.

30 Claims, 6 Drawing Sheets

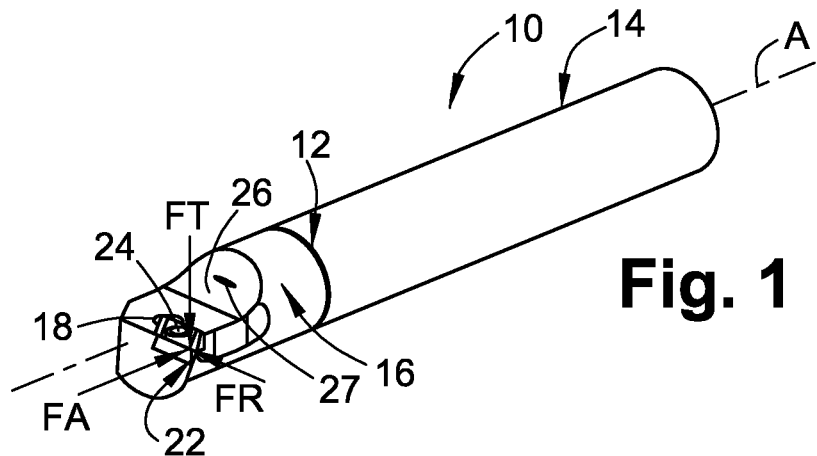
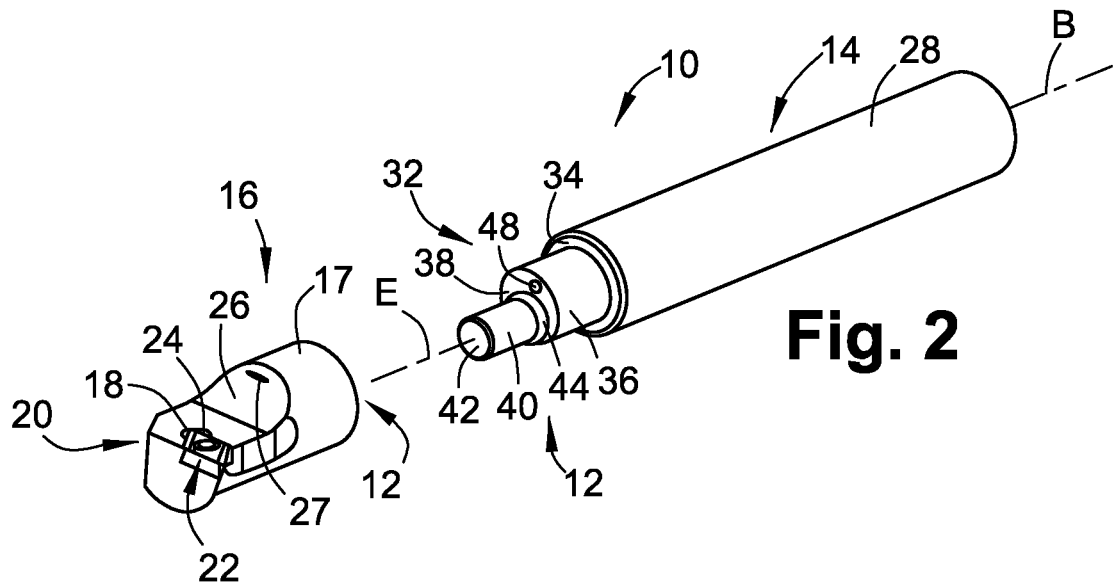
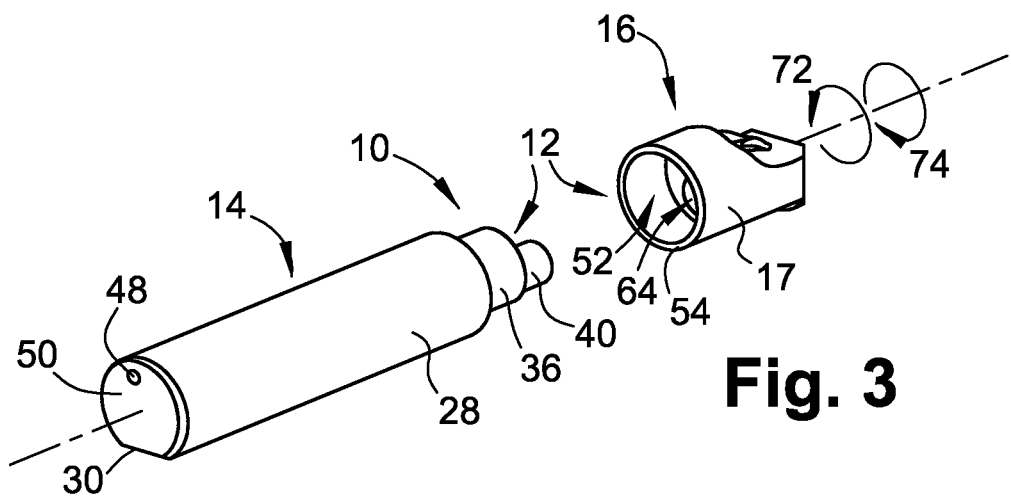

CUTTING TOOL HAVING A CLAMPING MECHANISM

FIELD OF THE INVENTION

The present invention relates to the field of cutting tools having clamping mechanisms and more specifically, clamping mechanisms between a holder and a shank.

BACKGROUND OF THE INVENTION

The use of clamping mechanisms is widely spread in the cutting tools industry. There are many types of clamping mechanisms for a wide range of uses.

In some cutting tools, a cutting insert, typically made of cemented carbide or other hard material, is retained in an insert holder, typically made of steel. At a large overhang, when the length to diameter ratio of the cutting tool is relatively high, it is advantageous to use a cemented carbide shank in order to increase the overall rigidity of the cutting tool. Such a use of a cemented carbide shank, however, is also advantageous in cutting tools having shorter overhang. With such type of cutting tools, a cutting insert or a plurality of cutting inserts, are retained within an insert holder made of steel, and, the insert holder is retained to a cemented carbide shank.

There are several types of mechanisms for attaching an insert holder to a cemented carbide shank. At some mechanisms, the insert holder is pulled rearwardly by means of a clamping bolt that extends along a through bore in the shank. The clamping of the insert holder to the shank takes place by tightening the clamping bolt from the rear side of the shank. A disadvantage of such a form of clamping is that, in order to replace the insert holder, it is necessary to remove the shank from its position at the tool machine in order to be able to untighten the clamping bolt. Such a task, of course, is labor and time consuming.

In other mechanisms, the tightening of the insert holder is carried out by a clamping bolt that passes through a front side or a peripheral side of the insert holder. The clamping bolt may engage into the insert holder or the shank. Such a clamping requires additional threads to be made, a task that is relatively costly in a cemented carbide shank. Furthermore, additional holes in the insert holder reduce the ability to smoothly remove the chips that are produced during machining.

In other cutting tools, a rear end of the steel insert holder is brazed to a front end of the cemented carbide shank. A disadvantage of such a connection is the relative large distance between the cemented carbide shank and the point of exerting the force on the cutting insert during machining. When the forces exerted on the cutting insert are mainly radial, such a relative large distance reduces the advantage of having a rigid shank, and, enables distortion and vibration to develop in the insert holder.

U.S. Pat. No. 6,394,465 to Guy discloses a clamping device (1, 25, 35) for releasably clamping an insertion member (9, 27, 38) with a shank portion. The clamping device comprising a clamping member having an insertion bore (11, 26, 40) formed by the union of an access bore portion (19A, 31A, 41A) and a gripping bore portion (19B, 31B, 41B) for the free sliding insertion into and withdrawal from the shank portion in respect of the access bore portion and its clamping by a clamping surface of the gripping bore portion on its forced displacement thereinto from the access bore portion. The access and gripping bore portions having longitudinal axes (20A, 20B; 32A, 32B; 43A, 43B) spaced apart at least along a portion thereof.

The clamping device of '465 enables firm clamping of the shank portion by the gripping bore portion. However, the firm clamping is maintained by means of an external force exerted by an additional device such as a sleeve, clamping screw or wrench (17, 29, 35). The external force guarantees that the shank remains pressed against the gripping bore portion. Without the additional device, the clamping device of '465 cannot perform as such, since, any external force applied on the gripped shank, in a direction transverse to a longitudinal direction of the shank, will pull out the shank out of the gripping bore portion.

SUMMARY OF THE INVENTION

In accordance with the present invention there is provided a clamping mechanism comprising a male portion and a female portion;

the male portion comprising:
a body portion having a shank front surface in a front portion thereof;
a locking protrusion extending forwardly from the shank front surface, the locking protrusion having rotational symmetry around a locking protrusion axis, a locking protrusion diameter and a locking protrusion radius at a given first cross-section perpendicular to the locking protrusion axis, and a locking protrusion front surface in a front portion thereof; and
an alignment protrusion extending forwardly relative to the locking protrusion front surface, the alignment protrusion having rotational symmetry around an alignment protrusion axis, and having an alignment protrusion diameter at a given second cross-section; and
a female portion comprising:
a female body having a holder rear surface in a rear portion thereof;
a locking bore having a locking bore front end in a front portion thereof, extending forwardly from the holder rear surface, the locking bore comprising:
an insertion bore portion having an insertion bore radius at a given third cross-section and an insertion bore axis, and
a gripping bore portion having a gripping bore radius at the given third cross-section and a gripping bore axis, the gripping bore axis being spaced apart from the insertion bore axis by a non-zero first distance; and
an alignment bore extending forwardly relative to the locking bore front end, the alignment bore having an alignment bore axis which is spaced apart by a second distance from the gripping bore axis, and an alignment bore diameter at a given fourth cross-section; wherein:
in an unclamped position of the clamping mechanism, the gripping bore radius is smaller than the locking protrusion radius;
the axial location of the given first cross-section coincides with the axial location of the given third cross-section in a clamped position of the clamping mechanism; and
the axial location of the given second cross-section coincides with the axial location of the given fourth cross-section in a clamped position of the clamping mechanism.

Advantageously, in a clamped position of the clamping mechanism, the locking protrusion abuts the gripping bore portion at a gripping surface thereof along a gripping angular extension that is larger than 180° and the alignment protrusion abuts a portion of the alignment bore.

Typically, the gripping angular extension is larger than 180° and smaller than 190°.

When assembling the clamping mechanism, in a first assembling step, the female member is axially brought toward the male member such that the alignment bore is freely axially guided over the alignment protrusion, and, the insertion bore portion is freely axially guided over the locking protrusion;

in a second assembling step, the insertion bore portion is rotated with respect to the alignment bore axis such that the gripping bore portion is forcibly positioned over the locking protrusion.

Advantageously, the gripping bore portion of the female portion remains locked over the locking protrusion of the male portion without necessity of any additional device.

If desired, in a clamped position, the holder rear surface abuts the shank front surface.

In one embodiment, the locking protrusion converges rearwardly at a first protrusion angle with respect to the locking protrusion axis;

the locking bore converges rearwardly at a first bore angle with respect to the gripping bore axis; and the first bore angle may be similar to the first protrusion angle or slightly larger therefrom.

Typically, the first protrusion angle is in the range of 1° to 20°.

If desired, in a clamped position, the holder rear surface abuts the shank front surface.

In one embodiment, the alignment protrusion converges forwardly at a second protrusion angle;

the alignment bore converges forwardly at a second bore angle; and the second bore angle may be similar to the second protrusion angle or slightly larger therefrom.

Typically, the second protrusion angle is in the range of 2° to 30°.

In one embodiment, in a clamped position, the holder rear surface remains unabutted from the shank front surface.

Typically, the first distance is in the range from 0.2 mm to 2 mm.

Further typically, the locking protrusion has a locking protrusion length;

the alignment protrusion has an alignment protrusion length; and the alignment protrusion length is larger than the locking protrusion length.

In another aspect, the present invention is directed to a cutting tool having a clamping mechanism comprising a male member and a female member which form two components. The cutting tool may further comprise a cutting insert and the alignment protrusion may extend forwardly to a point that is generally radially inward with respect to the cutting insert.

BRIEF DESCRIPTION OF THE DRAWINGS

For a better understanding of the present invention and to show how the same may be carried out in practice, reference will now be made to the accompanying drawings, in which:

FIG. 1 is a perspective view of a cutting tool clamped by a clamping mechanism in accordance with the present invention;

FIG. 2 is an exploded perspective view of the cutting tool of FIG. 1;

FIG. 3 is an exploded rear perspective view of the cutting tool of FIG. 1;

DETAILED DESCRIPTION OF THE INVENTION

Figure 4:
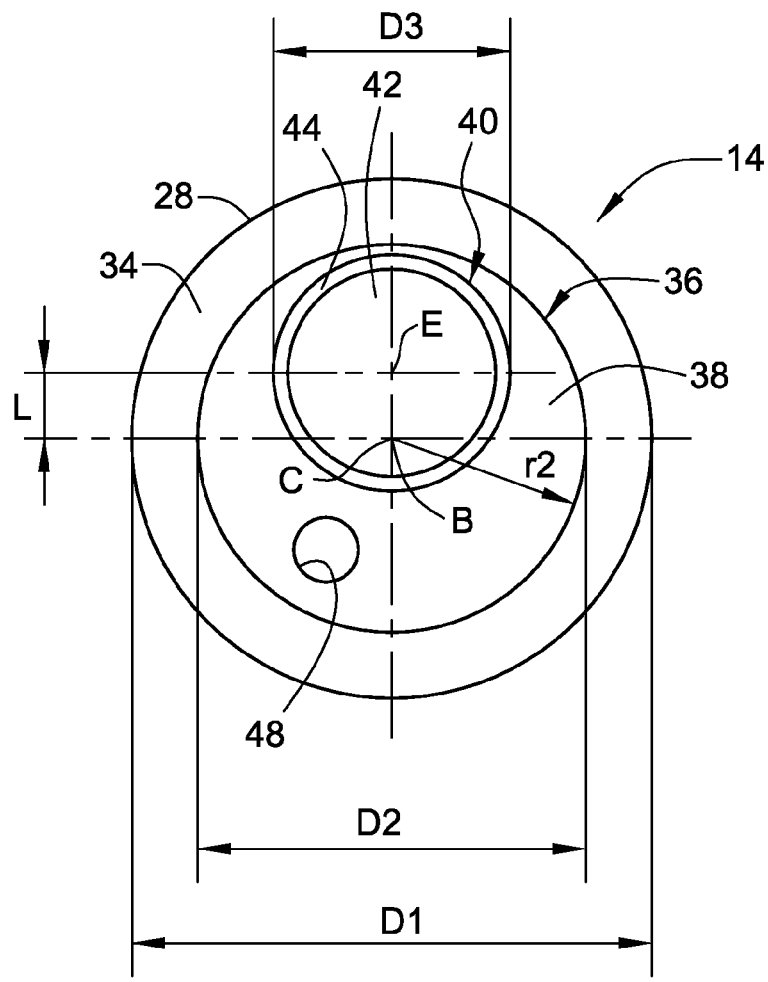
FIG. 4 is a front view of the shank.

Attention is first drawn to FIGS. 1 to 5. FIGS. 1 to 3 show a cutting tool 10 clamped by a clamping mechanism 12 according to the present invention. The cutting tool 10 has a cutting tool axis A and comprises a shank 14 and an insert holder 16 that is detachably connected to the shank 14. The present disclosure describes the male portion of the clamping mechanism as a shank 14 and the female portion of the clamping mechanism as the insert holder 16. It is understood, however, that in a general sense, the male portion is simply a first component while the female portion is a second component.

The shank 14 according to the present invention is made of cemented carbide. However, the present invention is not limited to shanks made of cemented carbide only and other shank materials may be equally applied, such as hard steel, tools steel, or the like.

The insert holder 16 according to the present invention is made of tools steel. However, the present invention is not limited to insert holders made of tools steel only and other materials may be equally applied, yet, it is advantageous that the insert holder material be softer than the shank material.

The insert holder 16 is provided with a second component body 17, and, with an insert pocket 18 in a front portion 20 of the insert holder 16. A cutting insert 22 is securely retained in the insert pocket 18 by means of a clamping screw 24. A chip gullet 26 extends rearwardly from the cutting insert 22 in order to adequately remove the chips produced during machining. An insert holder cooling bore 27 is provided at the chip gullet 26 in order to provide cooling agent to the cutting insert 22 during machining.

The insert pocket 18, as well as the form of retention of the cutting insert 22 to the insert pocket 18, do not form an essential feature of the present invention and therefore will not be further described. Furthermore, the cutting insert 22 does not have to be retained to the insert holder 16 by means of a clamping screw 24 and other retention methods may be equally applied. For example, the cutting insert 22 may be retained by means of a clamp. Alternatively, the cutting insert may be brazed to the insert pocket, or, may be integrally formed with the insert holder to have unitary one-piece construction. In such case, the entire holder effectively constitutes a replaceable insert.

As can be clearly seen in FIG. 2, the shank 14, having a shank axis B, has an elongated shank body 28 having a shank body diameter D1. During machining, the shank body 28 is retained by means of an adapter or directly by the cutting machine (not shown). According to one embodiment of the present invention, the shank body 28 is cylindrical. In such case, the shank body 28 may be provided with a shank notch 30 in order to facilitate the securing of the shank body 28 to the cutting machine. It is understood that other shapes of the shank body 28 are possible. For example, the shank body 28 may be conical, square, hexagonal or of any other desired form.

A front portion 32 of the shank body 28 is provided with an annular shank front surface 34. The shank front surface 34 may be planar and perpendicular to the shank axis B.

A locking protrusion 36 extends forwardly from the shank front surface 34. The locking protrusion 36 is cylindrical, having a locking protrusion diameter D2, and has a locking protrusion axis C that coincides with the shank axis B. The locking protrusion diameter D2, having a locking protrusion radius r2, is smaller than the shank body diameter D1. The locking protrusion 36 extends forwardly from the shank front surface 34 a locking protrusion length L1 and ends with a locking protrusion front surface 38. The locking protrusion front surface 38 may be planar and perpendicular to the locking protrusion axis C.

Figure 5:
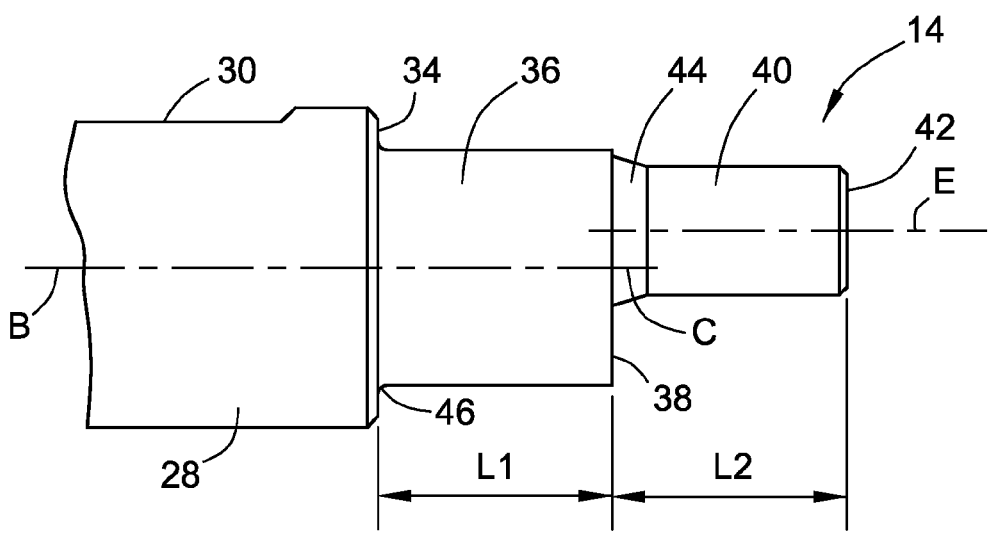
FIG. 5 is a side partial view of the shank.

An alignment protrusion 40 extends forwardly from the locking protrusion front surface 38. The alignment protrusion 40 is cylindrical, having an alignment protrusion diameter D3, and has an alignment protrusion axis E. As can be seen in FIGS. 4 and 5, the alignment protrusion diameter D3 is much smaller than the locking protrusion diameter D2.

The alignment protrusion axis E may be parallel to the locking protrusion axis C. However, the alignment protrusion axis E does not coincide with the locking protrusion axis C and is spaced therefrom an axis distance L. The alignment protrusion 40 extends forwardly from the locking protrusion front surface 38 an alignment protrusion length L2 and ends with an alignment protrusion front surface 42. In one embodiment, as seen in FIG. 5, the alignment protrusion length L2 is larger than the locking protrusion length L1. However, in other embodiments, the alignment protrusion length L2 may be equal or smaller than the locking protrusion length L1.

In one embodiment, the alignment protrusion 40 is provided with a reinforced portion 44 adjacent the locking protrusion front surface 38. In the same manner, the locking protrusion 36 may be provided with a second reinforced portion 46 adjacent the shank front surface 34. In some embodiments, the shank 14 is further provided with a shank cooling bore 48 that extends from a shank rear surface 50 of the shank 14 to the locking protrusion front surface 38.

Figure 6:
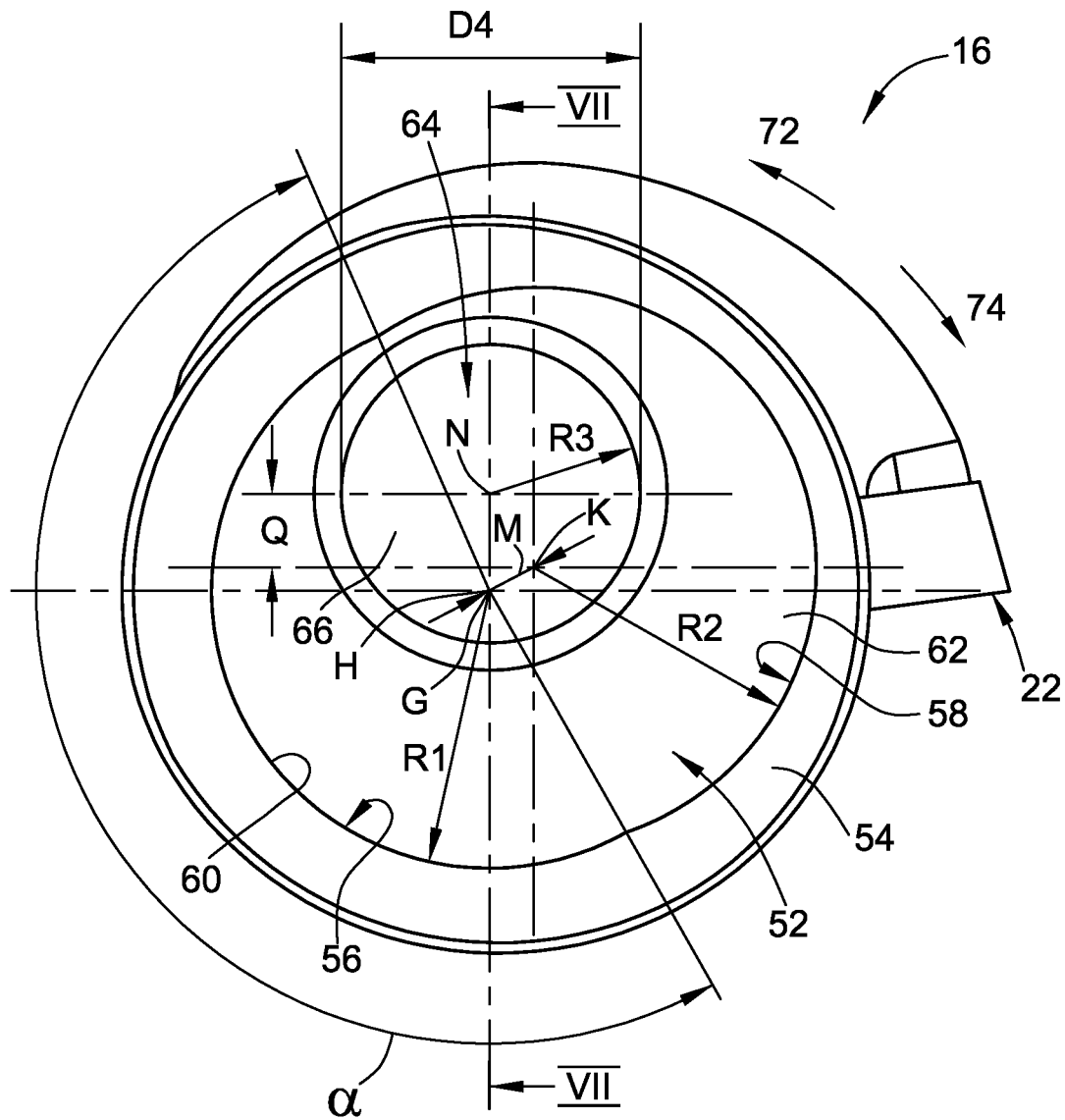
FIG. 6 is a rear view of the insert holder.
Figure 7:
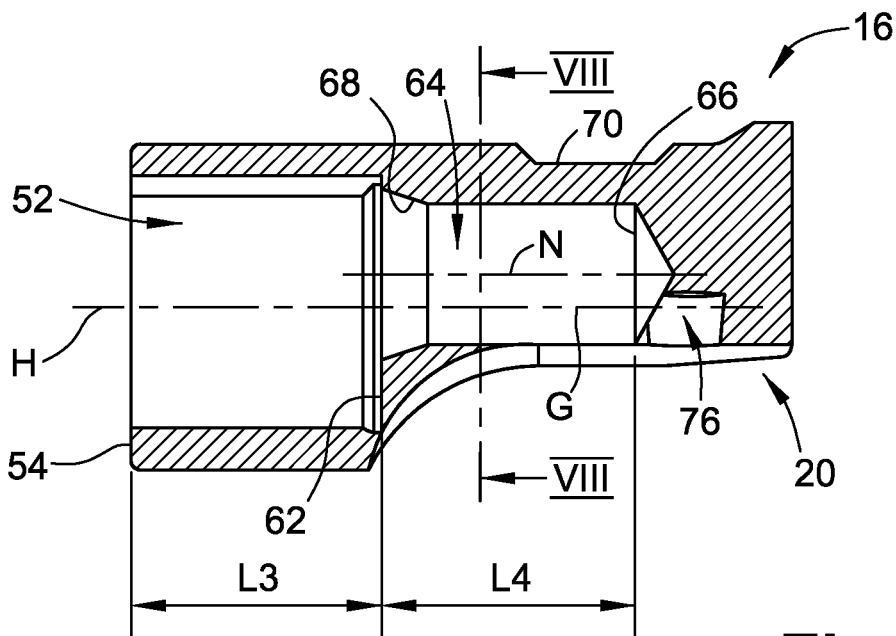
FIG. 7 is a side sectional view of the insert holder taken along line VII-VII in FIG. 6.
Figure 8:
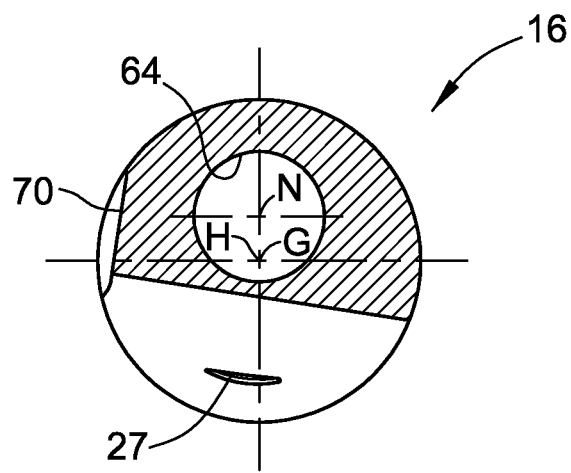
FIG. 8 is a cross-sectional view of the insert holder taken along line VIII-VIII in FIG. 7.

Attention is now drawn to FIGS. 6 to 8 which show the insert holder 16. As shown, the insert holder 16 comprises a locking bore 52 that opens to a holder rear end of the insert holder 16. The holder rear end has a holder rear surface 54 which may be planar and perpendicular to a holder axis G.

The locking bore 52 comprises two bore portions, namely, a gripping bore portion 56 and an insertion bore portion 58. As can be best seen in FIG. 6, the gripping bore portion 56 merges with the insertion bore portion 58. The gripping bore portion 56 has a gripping bore axis H that coincides with the holder axis G, and, a gripping bore radius R1. The peripheral envelope of the gripping bore portion 56 constitutes a gripping surface 60. The locking bore 52 extends forwardly from the holder rear surface 54 a locking bore length L3 and ends at a locking bore front end 62. The locking bore front end 62 may be planar and perpendicular to the holder axis G.

The gripping bore radius R1 is slightly smaller than the locking protrusion radius r2, i.e., R1<r2. Typically, the gripping bore radius R1 is smaller than the locking protrusion radius r2 by about 0.001 mm to 0.05 mm. According to one embodiment, the gripping bore radius R1 is smaller than the locking protrusion radius r2 by 0.005 mm.

The gripping bore portion 56 has a gripping angular extension α that is greater than 180°. Typically, the gripping angular extension α is larger than 180° and smaller than 190°. According to one embodiment, the gripping angular extension α is 184° with a deviation of ±0.5°.

The insertion bore portion 58 has an insertion bore axis K that may be parallel to the holder axis G, and, an insertion bore radius R2. The insertion bore radius R2 is larger than the locking protrusion radius r2 and larger than the gripping bore radius R1, i.e., R2>r2>R1. Typically, the insertion bore radius R2 is larger than the locking protrusion radius r2 by 0.01 mm to 1 mm. According to one embodiment, the insertion bore radius R2 is larger than the locking protrusion radius r2 by 0.1 mm.

As seen in FIG. 6, the insertion bore axis K is spaced apart by a non-zero first distance M from the gripping bore axis H. The line connecting between the insertion bore axis K and the gripping bore axis H may form a bisector of the gripping angular extension α, as seen in a rear view of the insert holder 16. The first distance M is typically in the range from 0.2 mm to 2 mm. However, larger or smaller magnitudes of the first distance M may be chosen depending on the size of the cutting tool 10. According to one embodiment, the first distance M is about 0.9 mm.

An alignment bore 64 extends forwardly from the locking bore 52 an alignment bore length L4, and ends with an alignment bore front end 66. As seen in FIG. 7, the alignment bore length L4 is larger than the locking bore length L3. However, in other embodiments, the alignment bore length L4 may be equal or smaller than the locking bore length L3.

The alignment bore 64 has an alignment bore axis N and an alignment bore diameter D4 having an alignment bore radius R3. The alignment bore diameter D4 is slightly larger than the alignment protrusion diameter D3 in order to enable free insertion of the alignment protrusion 40 into the alignment bore 64. In some embodiments, the alignment bore diameter D4 is larger than the alignment protrusion diameter D3 by 0.005 mm to 0.5 mm.

The alignment bore axis N may be parallel to the gripping bore axis H. As shown in FIG. 6, the alignment bore axis N does not coincide with the gripping bore axis H and is spaced away therefrom by a second distance Q.

In one embodiment, the alignment bore 64 is provided, in a rear portion thereof, with a bore enlargement 68. The bore enlargement 68 serves two purposes. First, it facilitates easy insertion of the alignment protrusion 40 into the alignment bore 64. Second, it mates with the reinforced portion 44 between the locking protrusion 36 and the alignment protrusion 40.

Typically, the insert holder 16 may be provided with at least one holder notch 70 in order to facilitate the use of a wrench (not shown) for final tightening of the insert holder 16 onto the shank 14.

The method of use of the clamping mechanism 12, namely, the assembling of the insert holder 16 onto the shank 14, will now be described.

First, the insert holder 16 is axially aligned with the shank 14 such that the alignment protrusion 40 is inserted into the alignment bore 64, and the alignment protrusion axis E generally coincides with the alignment bore axis N. The term "generally coincides" refers to the fact that the alignment protrusion axis E may coincide with the alignment bore axis N up to the production clearances between the alignment protrusion 40 and the alignment bore 64.

Second, the locking protrusion 36 is axially aligned with the insertion bore portion 58.

At the next stage, the insert holder 16 is axially pushed in a linear movement towards the shank 14, until the holder rear surface 54 abuts against the shank front surface 34. It is understood that up to this stage, there is no tension involved between the insert holder 16 and the shank 14.

Next, the insert holder 16 is eccentrically rotated with respect to the shank 14, around the alignment protrusion axis E, in a locking direction of the insert holder 16, such that the alignment bore 64 retains the alignment protrusion 40 as an axle, abutting a portion thereof, and the locking protrusion 36 is forcibly inserted into the gripping bore portion 56. Since the gripping bore radius R1 is slightly smaller than the locking protrusion radius r2, the insert holder 16 has to be forcibly rotated, by, for example, a wrench grasping the holder notch 70 such that the gripping bore portion 56 is slightly enlarged due to the elasticity of the insert holder 16. The insert holder 16 is eccentrically rotated until the locking protrusion 36 fully abuts against the gripping surface 60 of the gripping bore portion 56, thereby forming a circumferential interference fit in which circumferential outer surface of the locking protrusion 36 abuts the circumferential inner surface of the gripping bore portion 56.

At this position, the relative rotation between the insert holder 16 and the shank 14 is stopped, and the external tightening wrench may be removed since the alignment protrusion abuts a portion of the alignment bore, and, the locking protrusion 36 is independently and safely held by the gripping bore portion 56 since the gripping angular extension α of the gripping bore portion 56 is larger than 180°.

Thus, the cutting tool 10 provides a clamping mechanism 12 that remains safely locked without necessity of any additional device, and so the two members 14, 16 are secured to one another without a retaining screw or other mechanism securing the insert holder 16 to either the locking protrusion 36 or to the alignment protrusion 40. Furthermore, as can be clearly appreciated by a person skilled in the art, the clamping mechanism 12 is easy and simple to use, since only a very small relative rotational movement is required to achieve the circumferential interference fit, typically, about 2°, between the insert holder 16 and the shank 14 to pass from an unlocked position to a locked position and vice versa.

As shown in FIGS. 3 and 6, wherein the insert holder 16 is viewed from its rear, in order to bring the insert holder 16 to a locked position with respect to the shank 14, the insert holder 16 is eccentrically rotated in an anticlockwise direction as shown by the locking direction 72. Correspondingly, in order to bring the insert holder 16 to an unlocked position with respect to the shank 14, the insert holder 16 is eccentrically rotated in a clockwise direction as shown by the unlocking direction 74.

When the cutting tool 10 is operable in a cutting process, the tangential forces FT acting on the cutting insert 22 during machining, tend to hold the insert holder 16 tightened to the shank 14 thus contributing to the strength of the tightening of the clamping mechanism 12. It can be appreciated by a person skilled in the art that also the radial forces FR and the axial forces FA that act on the cutting insert 22 during machining tend to hold the insert holder 16 tightened to the shank 14.

The simple and easy clamping of the cutting head 16 to the shank 14 enables easily replacement of the insert holder 16 while the shank 14 remains clamped to the cutting machine. Thus, time and labor may be saved during replacement of an insert holder 16.

In order to remove the insert holder 16 from the shank 14, the former is simply eccentrically rotated, by means of a wrench, with respect to the shank 14 in the unlocking direction 74. This causes the alignment protrusion 40, which serves an axle, to rotate within the alignment bore 64, and causes the locking protrusion 36 to disengage from the gripping bore portion 56 and freely rest within the insertion bore portion 58. At this stage, there is no tension between the insert holder 16 and the shank 14, and the insert holder 16 may be freely pulled linearly forwardly and removed from the shank 14.

Furthermore, since in a locked position the locking protrusion 36 firmly abuts within the gripping bore portion 56 while the alignment protrusion abuts a portion of the alignment bore, the position of the insert holder 16, and, thereby, the position of the active cutting edge of the cutting insert 22, is well defined within the allowable tolerances. Therefore, when the shank 14 remains clamped to the cutting machine and only the insert holder 16 is replaced, the new insert holder 16 will be clamped on the shank 14 with the same location and directional orientation of the cutting insert 22, and, a good repeatability is obtained. Thus, a fast and economical replacement of the insert holder 16 is achieved, and time consuming task of adjusting the cutting edge of the new cutting insert 22 is advantageously avoided.

Since only a slight angular movement is required in order to bring the insert holder 16 from an unlocked position to a locked position, the cutting tool 10 using the clamping mechanism 12 according to the present invention, is particularly useful in hard to reach places where the space available for the dismantling of the insert holder 16 is somewhat limited.

Since it is easy to replace the insert holder 16, it is advantageous to use several types of insert holders if necessary, i.e., after using a given insert holder it may be easily replaced by another insert holder that may have another function and retain a different kind of cutting insert therein. Thus, it may be economical to produce several, so called, "blank" insert holders having the same clamping portion for engaging with a single shank 14. Then, the front portion of each of the insert holders may be easily machined to meet requirement of a specific function.

As shown in FIG. 7, the alignment bore front end 66 of the alignment bore 64 extends forwardly almost to the front portion 20 of the insert holder 16. In some embodiments, as shown for example in FIGS. 7 and 9, the alignment bore 64 opens to an insert pocket relief bore 76 that is a part of the insert pocket 18. This feature practically means that in a locked position of the insert holder 16 on the shank 14, the alignment protrusion 40 extends forwardly to a point, or almost to a point, that is radially inwardly with respect to the cutting insert 22.

Figure 11:
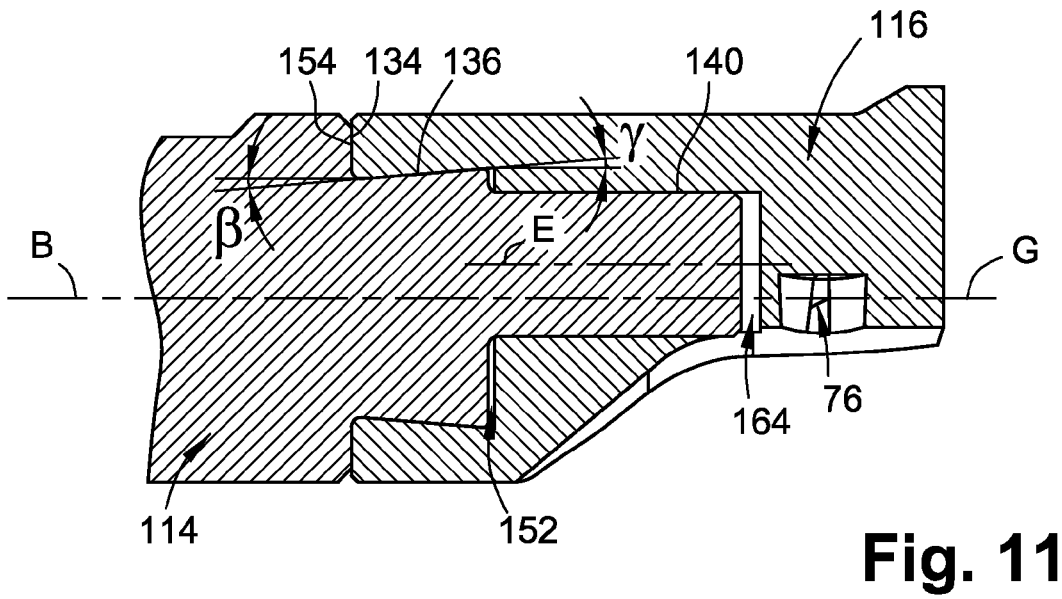
FIG. 11 is a longitudinal cross-sectional view of an assembled shank an insert holder according to another embodiment of the present invention.
Figure 12:
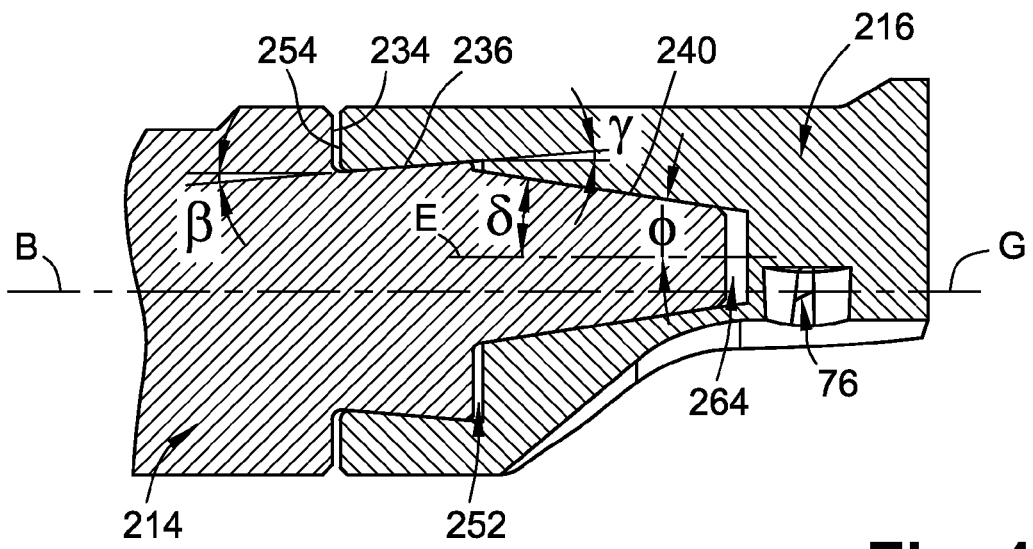
FIG. 12 is a longitudinal cross-sectional view of an assembled shank an insert holder according to another embodiment of the present invention.

This feature applies also to the embodiments shown in FIGS. 11 and 12. Namely, even the alignment bore does not open to the insert pocket relief bore 76, still, the alignment protrusion extends forwardly to a point, or almost to a point, that is radially inwardly with respect to the cutting insert 22.

Since the material of the shank 14 is typically much harder than the material of the insert holder 16, for example, cemented carbide comparing to tools steel, the support of the alignment bore 64 by the alignment protrusion 40 substantially increases the overall rigidity of the insert holder 16. Thus, the present invention provides a clamping mechanism with an extended support of the shank. The extended support of the shank is particularly advantageous when the shank is made of cemented carbide.

In this way, the cutting tool 10 benefits in two aspects. First, the construction of the insert holder 16 from tools steel makes it relatively cheep, easy to produce and easy to replace. Second, the extended support of the cemented carbide shank provides the cutting tool 10 with a high rigidity, similar to the rigidity it would have had if it were made all of cemented carbide. Thus, by increasing the rigidity of the cutting tool 10, it is less susceptible to bending and vibrations and, therefore, may perform at a higher degree of accuracy.

Figure 9:
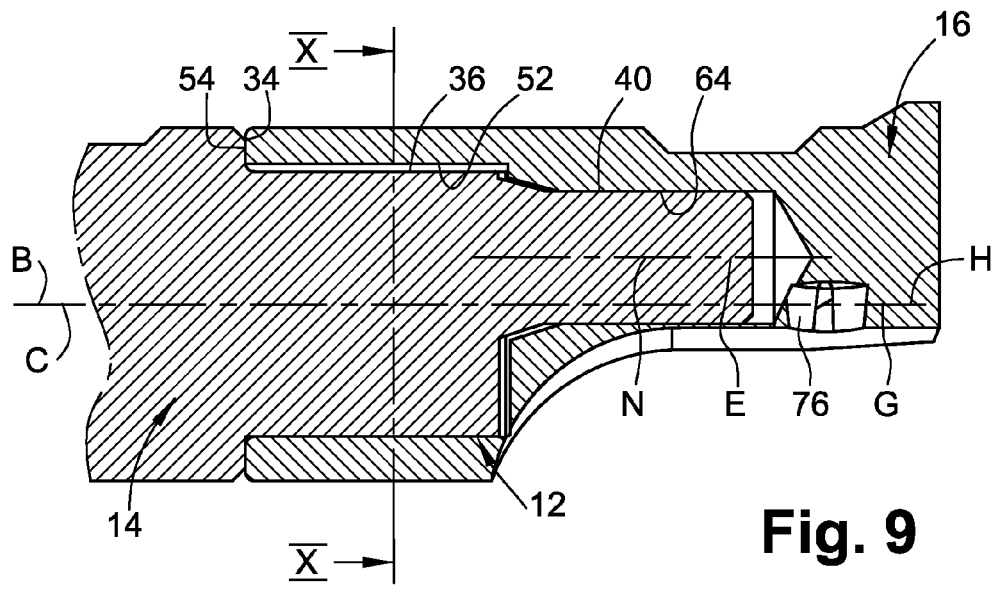
FIG. 9 is a longitudinal cross-sectional view of the assembled shank and insert holder taken along line IX-IX in FIG. 10.

FIG. 9 is a longitudinal cross-sectional view of the assembled shank 14 and insert holder 16 clamped by the clamping mechanism 12 according to the present invention. As shown, in the clamped position, the locking protrusion 36 is retained within the locking bore 52, the alignment protrusion 40 is retained within the alignment bore 64, and, the holder rear surface 54 abuts the shank front surface 34.

Figure 10:
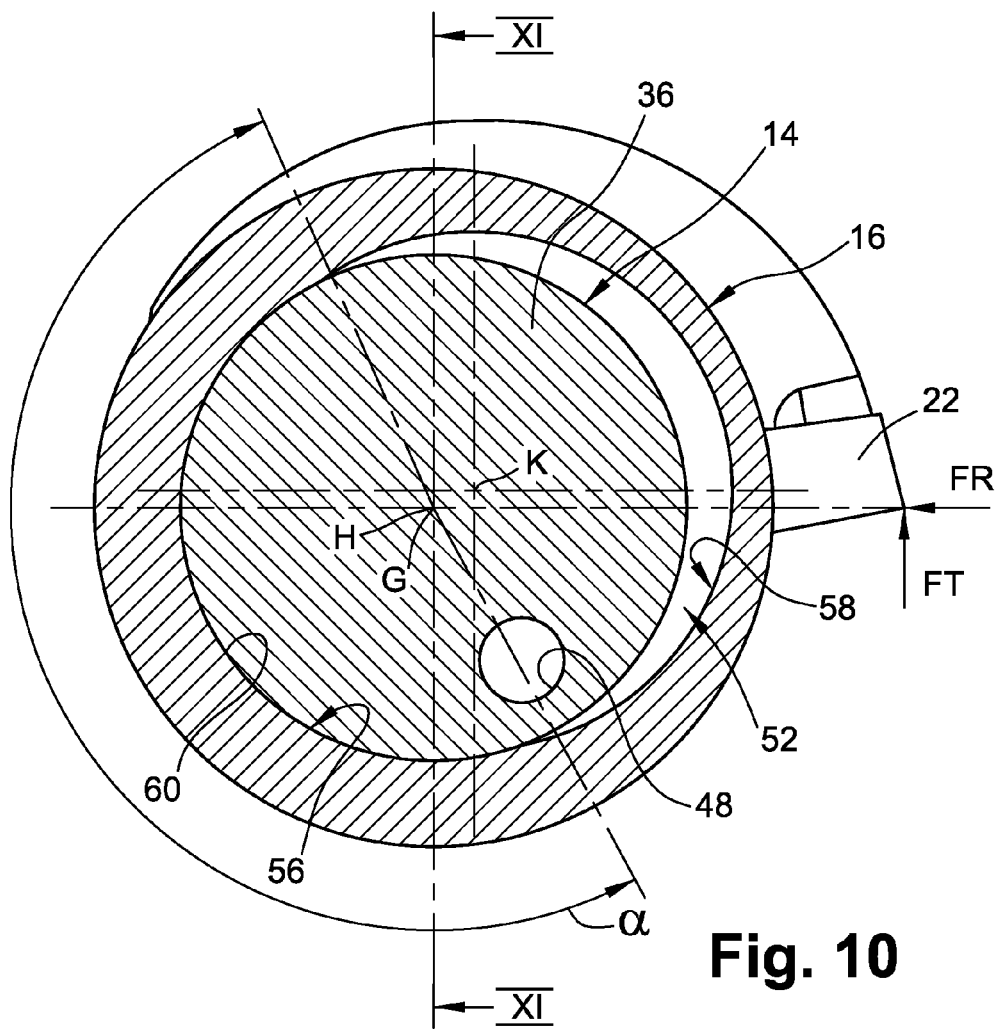
FIG. 10 is a cross-sectional view of the assembled shank and insert holder taken along line X-X in FIG. 9.

FIG. 10 shows a cross-section through the locking protrusion 36 and the locking bore 52 when the insert holder 16 is assembled on the shank 14.

As shown in FIG. 10, in a clamped position of the locking protrusion 36, it is clamped by the gripping bore portion 56 and fully abuts the gripping surface 60 along a gripping angular extension α that is larger than 180°. In this position, the insertion bore portion 58 remains unabutted. As already mentioned, the alignment protrusion abuts a portion of the alignment bore (not shown in this figure) and the insert holder 16 remains clamped to the shank 14 without any additional device or force involved. Therefore, in order to bring the insert holder 16 to an unclamped position with respect to the shank 14, a wrench has to be used in order to eccentrically rotate the insert holder 16 in an unlocking direction 74 with respect to the shank 14.

FIG. 11 is a longitudinal cross-sectional view of an assembled shank and insert holder clamped in accordance with another embodiment of a clamping mechanism according to the present invention. In this embodiment, like reference numerals, as used with respect to the embodiment shown in FIGS. 1 to 10, are designated with like reference numerals but shifted by 100.

In this embodiment, an insert holder 116 is clamped on a shank 114. The shank 114 comprises a shank front surface 134. A locking protrusion 136 extends forwardly from the shank front surface 134. An alignment protrusion 140 extends forwardly from the locking protrusion 136. The locking protrusion 136 converges rearwardly and is slanted at a first protrusion angle β with respect to the shank axis B. The first protrusion angle β may be in the range of 1° to 20°. According to a specific embodiment of the present invention, the first protrusion angle β is 10°.

The insert holder 116 has a holder rear surface 154. A locking bore 152 extends forwardly from the holder rear surface 154. The locking bore 152 converges rearwardly and is slanted at a first bore angle γ with respect to the holder axis G. The first bore angle γ may be similar to the first protrusion angle β or slightly larger therefrom. An alignment bore 164 extends forwardly from the locking bore 152.

The construction of the locking bore 152, except for its rearward convergence by the first bore angle γ, is similar to the construction of the locking bore 52 described with reference to the embodiment shown in FIGS. 1 to 10. Thus, the locking bore 152 comprises a gripping bore portion and an insertion bore portion, which, in cross-section, is similar to the cross-section shown in FIG. 10.

The locking of the insert holder 116 on the shank 114 is carried out in the same manner as described with reference to the embodiment shown in FIGS. 1 to 10. However, since the locking protrusion 136 and the locking bore 152 converge rearwardly, the insert holder 116 is positively locked on the shank 116. Thus, even if the insert holder 116 is subjected to large axial forces that tend to pull the insert holder 116 out of its pocket during machining, the insert holder 116 will resist from becoming detached from the shank 114.

FIG. 12 is a longitudinal cross-sectional view of an assembled shank and insert holder clamped in accordance with yet another embodiment of a clamping mechanism according to the present invention. In this embodiment, like reference numerals, as used with respect to the embodiment shown in FIGS. 1 to 10, are designated with like reference numerals but shifted by 200.

In this embodiment, an insert holder 216 is clamped on a shank 214. The shank 214 comprises a shank front surface 234. A locking protrusion 236 extends forwardly from the shank front surface 234. The locking protrusion 236 converges rearwardly and is slanted at a first protrusion angle β with respect to the shank axis B, similar to the first protrusion angle β as described with respect to FIG. 11.

An alignment protrusion 240 extends forwardly from the locking protrusion 236. The alignment protrusion 240 converges forwardly and is slanted at a second protrusion angle δ with respect to the alignment protrusion axis E. The second protrusion angle δ may be in the range of 2° to 30°. According to a specific embodiment of the present invention, the second protrusion angle δ is 10°.

The insert holder 216 has a holder rear surface 254. A locking bore 252 extends forwardly from the holder rear surface 254. The locking bore 252 converges rearwardly and is slanted at a first bore angle γ with respect to the holder axis G, similar to the first bore angle γ as described with respect to FIG. 11. An alignment bore 264 extends forwardly from the locking bore 252. The alignment bore 264 converges forwardly and is slanted at a second bore angle φ. The second bore angle φ may be similar to the second protrusion angle δ or slightly larger therefrom.

The construction of the locking bore 252, except for its rearward convergence by the first bore angle γ, is similar to the construction of the locking bore 52 previously described with reference to the embodiment shown in FIGS. 1 to 10. Thus, the locking bore 252 comprises a gripping bore portion and an insertion bore portion, which, in cross-section, is similar to the cross-section shown in FIG. 10.

In order to bring the insert holder 216 to a clamped position with the shank 214, the insert holder 216 is axially aligned with the shank 214. Then, the insert holder 216 is axially moved towards the shank 214 until the alignment bore 264 abuts the alignment protrusion 240. In this position, as well as in the final clamped position, the holder rear surface 254 remains spaced apart from the shank front surface 234.

The locking of the insert holder 216 on the shank 214 is carried out in the same manner as described with reference to the embodiment shown in FIGS. 1 to 10. However, since the locking protrusion 236 and the locking bore 252 converge rearwardly, the insert holder 216 is positively locked on the shank 216. Thus, even if the insert holder 216 is subjected to large axial forces that tend to pull the insert holder 216 out of its pocket during machining, disengagement of the insert holder 216 will be prevented. Furthermore, since the alignment bore 264 firmly abuts against the alignment protrusion 240 due to their mutual forward convergence, further support will be applied to the cutting insert during machining since even a slight clearance between the alignment protrusion 240 and the alignment bore 264 is avoided.

Although the present invention has been described to a certain degree of particularity, it should be understood that various alterations and modifications could be made without departing from the spirit or scope of the invention as hereinafter claimed.

For example, the locking direction 72 and the unlocking direction 74 do not have to be as shown in the drawings and they may be oppositely designed for an oppositely directed locking of the insert holder with respect to the shank.

The clamping mechanism 12 does not have to be used only for clamping an insert holder, constituting a female portion, to a shank, constituting a male portion. Thus, the clamping mechanism 12 may be used for clamping together two male and female portions of an adaptor, extending rods, and the like, the male and female portions comprising complementary components.

As shown, the locking protrusion, as well as the locking bore, may be generally cylindrical or conical. Likewise, the alignment protrusion, as well as the alignment bore, may be generally cylindrical or conical. Namely, they all have rotational symmetry with respect of a given longitudinal axis.

Therefore, in order to describe the diametrical relation between the respective shank protrusion and its corresponding holder bore in case where they are conical, the relation is measured with respect to a given cross-section that is perpendicular to the respective longitudinal axes, and, the given cross-sections of the shank protrusion coincide with the respective cross-sections of the holder bore in a clamped position of the clamping mechanism.

What is claimed is:

1. A clamping mechanism (12) comprising a male portion (14, 114, 214) and a female portion (16, 116, 216) which are adjustable between an unclamped position and a clamped position relative to one another;

the male portion comprising:
 a first component body (28) having a first component axis (B) defining a forward to rear direction, and a first component front surface (34);
 a locking protrusion (36, 136, 236) extending forwardly relative to the first component front surface (34), the locking protrusion having a locking protrusion axis (C) and a locking protrusion front surface (38); and
 an alignment protrusion (40, 140, 240) extending forwardly relative to the locking protrusion front surface (38), the alignment protrusion having an alignment protrusion axis (E) and an alignment protrusion front surface (42); and the female portion comprising:
 a second component body (17) having a second component axis (G) defining a forward to rear direction, and a second component rear surface (54, 154, 254);
 a locking bore (52, 152, 252) extending forwardly relative to the second component rear surface (54, 154, 254) and having a locking bore front end (62), the locking bore comprising:
  an insertion bore portion (58) having an insertion bore axis (K); and
  a gripping bore portion (56) having a gripping bore axis (H) which is spaced apart from the insertion bore axis (K) by a non-zero first distance (M), the gripping bore portion merging with the insertion bore portion; and
 an alignment bore (64, 164, 264) extending forwardly relative to the locking bore front end (62), the alignment bore having an alignment bore axis (N) which is spaced apart from the gripping bore axis (H) by a non-zero second distance (Q);

wherein:
in the unclamped position:
 the alignment protrusion occupies the alignment bore;
 the locking protrusion occupies the insertion bore portion of the locking bore; and
 no interference fit is formed between the locking protrusion and the locking bore; and in the clamped position:
 the alignment protrusion abuts a portion of the alignment bore;
 the locking protrusion occupies the gripping bore portion of the locking bore;
 the locking protrusion abuts a gripping surface (60) of the gripping bore portion; and
 an interference fit is formed between the locking protrusion and the locking bore.

2. The clamping mechanism (12) according to claim 1, wherein:
in the clamped position, the locking protrusion (36) abuts the gripping surface (60) along a gripping angular extension ($\alpha$) that is larger than 180°.

3. The clamping mechanism (12) according to claim 2, wherein:
the gripping angular extension ($\alpha$) is larger than 180° and smaller than 190°.

4. The clamping mechanism (12) according to claim 1, wherein:
in the unclamped position, the gripping bore portion has a gripping bore radius (R1) which is smaller than a locking protrusion radius (r2) of the locking protrusion.

5. The clamping mechanism according to claim 1, wherein:
in the clamped position, the gripping bore portion (56) remains locked over the locking protrusion (36) without necessity of any additional device.

6. The clamping mechanism according to claim 1, wherein:
in the clamped position, the second component rear surface (54, 154) abuts the first component front surface (34, 134).

7. The clamping mechanism according to claim 1, wherein:
the locking protrusion (136, 236) converges rearwardly at a first protrusion angle ($\beta$);
the locking bore (152, 252) converges rearwardly at a first bore angle ($\gamma$); and
the first bore angle ($\gamma$) is similar to the first protrusion angle ($\beta$).

8. The clamping mechanism according to claim 7, wherein:
the first protrusion angle ($\beta$) is in the range of 1° to 20°.

9. The clamping mechanism according to claim 7, wherein:
in the clamped position, the second component rear surface (154) abuts the first component front surface (134).

10. The clamping mechanism according to claim 7, wherein:
the alignment protrusion (240) converges forwardly at a second protrusion angle ($\delta$);
the alignment bore (264) converges forwardly at a second bore angle ($\phi$); and
the second bore angle ($\phi$) is similar to the second protrusion angle ($\delta$).

11. The clamping mechanism according to claim 10, wherein:
the second protrusion angle ($\delta$) is in the range of 2° to 30°.

12. The clamping mechanism according to claim 10, wherein:
in the clamped position, the second component rear surface (254) remains unabutted from the first component front surface (234).

13. The clamping mechanism according to claim 1, wherein:
the first distance (M) is in the range from 0.2 mm to 2 mm.

14. The clamping mechanism according to claim 1, wherein:
the locking protrusion (36) has a locking protrusion length (L1);

the alignment protrusion (40) has an alignment protrusion length (L2); and the alignment protrusion length (L2) is larger than the locking protrusion length (L1).

15. The clamping mechanism according to claim 1, wherein:

the male portion is formed of cemented carbide and the female portion is formed of steel.

16. A cutting tool (10) comprising a shank (14, 114, 214) and an insert holder (16, 116, 216) which are adjustable between an unclamped position and a clamped position relative to one another;

the shank comprising:

a shank body (28) having a shank axis (B) defining a forward to rear direction, and a shank front surface (34):

a locking protrusion (36, 136, 236) extending forwardly relative to the shank front surface (34), the locking protrusion having a locking protrusion axis (C) and a locking protrusion front surface (38); and an alignment protrusion (40, 140, 240) extending forwardly relative to the locking protrusion front surface (38), the alignment protrusion having an alignment protrusion axis (E) and an alignment protrusion front surface (42); and the insert holder comprising:

a holder body having a holder axis (G) defining a forward to rear direction, and a holder rear surface (54, 154, 254);

a locking bore (52, 152, 252) extending forwardly relative to the holder rear surface (54, 154, 254) and having a locking bore front end (62), the locking bore comprising:

an insertion bore portion (58) having an insertion bore axis (K); and a gripping bore portion (56) having a gripping bore axis (H) which is spaced apart from the insertion bore axis (K) by a non-zero first distance (M), the gripping bore portion merging with the insertion bore portion; and an alignment bore (64, 164, 264) extending forwardly relative to the locking bore front end (62), the alignment bore having an alignment bore axis (N) which is spaced apart from the gripping bore axis (H) by a non-zero second distance (Q);

wherein:

in the unclamped position:

the alignment protrusion occupies the alignment bore;

the locking protrusion occupies the insertion bore portion of the locking bore; and no interference fit is formed between the locking protrusion and the locking bore; and in the clamped position:

the alignment protrusion abuts a portion of the alignment bore;

the locking protrusion occupies the gripping bore portion of the locking bore;

the locking protrusion abuts a gripping surface (60) of the gripping bore portion; and an interference fit is formed between the locking protrusion and the locking bore.

17. The cutting tool according to claim 16, wherein:

the insert holder comprises a cutting insert (22).

18. The cutting tool according to claim 17, wherein:

the cutting insert (22) is a replaceable cutting insert removably secured to the insert holder.

19. The cutting tool according to claim 17, wherein:

the alignment protrusion extends forwardly to a point that is radially inward of the cutting insert (22).

20. The cutting tool according to claim 16, wherein:

in the clamped position, the locking protrusion (36) abuts the gripping surface (60) along a gripping angular extension ($\alpha$) that is larger than 180°.

21. The cutting tool according to claim 20, wherein:

the gripping angular extension ($\alpha$) is larger than 180° and smaller than 190°.

22. The cutting tool according to claim 16, wherein:

in the unclamped position, the gripping bore portion has a gripping bore radius (R1) which is smaller than a locking protrusion radius (r2) of the locking protrusion.

23. The cutting tool according to claim 16, wherein:

in the clamped position, the gripping bore portion (56) remains locked over the locking protrusion (36) without necessity of any additional device.

24. The cutting tool according to claim 16, wherein:

in the clamped position, the holder rear surface (154) abuts the shank front surface (134).

25. The cutting tool according to claim 16, wherein:

the locking protrusion (136, 236) converges rearwardly at a first protrusion angle ($\beta$);

the locking bore (152, 252) converges rearwardly at a first bore angle ($\gamma$);

the first bore angle ($\gamma$) is similar to the first protrusion angle ($\beta$); and the first protrusion angle ($\beta$) is in the range of 1° to 20°.

26. The cutting tool according to claim 25, wherein:

in the clamped position, the holder rear surface (154) abuts the shank front surface (134).

27. The cutting tool according to claim 25, wherein:

the alignment protrusion (240) converges forwardly at a second protrusion angle ($\delta$);

the alignment bore (264) converges forwardly at a second bore angle ($\phi$);

the second bore angle ($\phi$) is similar to the second protrusion angle ($\delta$); and the second protrusion angle ($\delta$) is in the range of 2° to 30°.

28. The cutting tool according to claim 27, wherein:

in the clamped position, the holder rear surface (254) remains unabutted from the shank front surface (234).

29. The cutting tool according to claim 16, wherein:

the first distance (M) is in the range from 0.2 mm to 2 mm.

30. The cutting tool according to claim 16, wherein:

the locking protrusion has a locking protrusion length (L1);

the alignment protrusion has an alignment protrusion length (L2); and the alignment protrusion length (L2) is larger than the locking protrusion length (L1).

* * * * *